United States Patent
Turetta et al.

(10) Patent No.: US 10,671,090 B2
(45) Date of Patent: Jun. 2, 2020

(54) AUTOMATIC COMMAND FOR LIFT CONTROL DEVICES

(71) Applicant: Embraer S.A., São José dos Campos-SP (BR)

(72) Inventors: Paulo Emilio da Silva Turetta, São José dos Campos (BR); Daniel Paulo de Tarso Ferreira, São José dos Campos (BR); Igor Miranda Rodrigues, São José dos Campos (BR)

(73) Assignee: Embraer S.A., Sao Jose dos Campos (BR)

(*) Notice: Subject to any disclaimer, the term of this patent is extended or adjusted under 35 U.S.C. 154(b) by 223 days.

(21) Appl. No.: 15/693,841

(22) Filed: Sep. 1, 2017

(65) Prior Publication Data

US 2019/0072958 A1    Mar. 7, 2019

(51) Int. Cl.
| | | |
|---|---|---|
| *G05D 1/04* | (2006.01) | |
| *B64C 13/00* | (2006.01) | |
| *B64C 13/16* | (2006.01) | |
| *B64C 13/18* | (2006.01) | |
| *B64C 13/22* | (2006.01) | |
| *G05D 1/00* | (2006.01) | |
| *B64C 13/02* | (2006.01) | |
| *B64C 9/16* | (2006.01) | |
| *B64C 9/22* | (2006.01) | |

(52) U.S. Cl.
CPC ............ *G05D 1/042* (2013.01); *B64C 13/00* (2013.01); *B64C 13/16* (2013.01); *B64C 13/18* (2013.01); *B64C 13/22* (2013.01); *G05D 1/0088* (2013.01); *B64C 9/16* (2013.01); *B64C 9/22* (2013.01); *B64C 13/02* (2013.01)

(58) Field of Classification Search
CPC ...... G05D 1/0088; G05D 1/042; B64C 13/22; B64C 13/16; B64C 13/00; B64C 13/18; B64C 9/16; B64C 9/22; B64C 13/02
See application file for complete search history.

(56) References Cited

U.S. PATENT DOCUMENTS

| | | | |
|---|---|---|---|
| 6,314,343 B1 * | 11/2001 | Adams et al. ....... | G05D 1/0055 701/3 |
| 7,366,592 B2 | 4/2008 | Delaplace et al. | |
| 8,356,776 B2 * | 1/2013 | Berens et al. .......... | B64C 13/16 701/3 |
| 9,126,677 B1 * | 9/2015 | Curtis ..................... | B64C 13/04 |
| 9,254,909 B2 | 2/2016 | Moser et al. | |
| 9,359,065 B2 | 6/2016 | Moser et al. | |
| 2002/0099479 A1 * | 7/2002 | Chatrenet et al. ... | G05D 1/0077 701/15 |
| 2011/0205090 A1 * | 8/2011 | Marstall et al. ..... | G01C 23/005 340/975 |

(Continued)

OTHER PUBLICATIONS

"Aircraft High-Lift Devices: Slats, Slots and Flaps—types and working principles," Zoombd24, Mar. 20, 2015, 10 pages.
Embraer 190—Flight Controls, smartcockpit.com, 49 pages.

*Primary Examiner* — Dale W Hilgendorf
(74) *Attorney, Agent, or Firm* — Nixon & Vanderhye, P.C.

(57) ABSTRACT

Aircraft and associated methods, apparatus, system and storage devices for automatically positioning of lift control devices such as high lift devices including slats and flaps so an aircraft equipped with this technology will not need to count on the crew to command the lift control devices.

25 Claims, 7 Drawing Sheets

(56) References Cited

U.S. PATENT DOCUMENTS

| | | | |
|---|---|---|---|
| 2015/0083850 A1* | 3/2015 | Moser et al. | B64C 13/16 |
| | | | 244/99.2 |
| 2016/0139597 A1* | 5/2016 | Letang et al. | B64C 13/22 |
| | | | 701/3 |
| 2016/0318601 A1* | 11/2016 | Arnold | B64C 13/16 |
| 2017/0305571 A1* | 10/2017 | Constans et al. | B64D 31/06 |

\* cited by examiner

-- PRIOR ART --

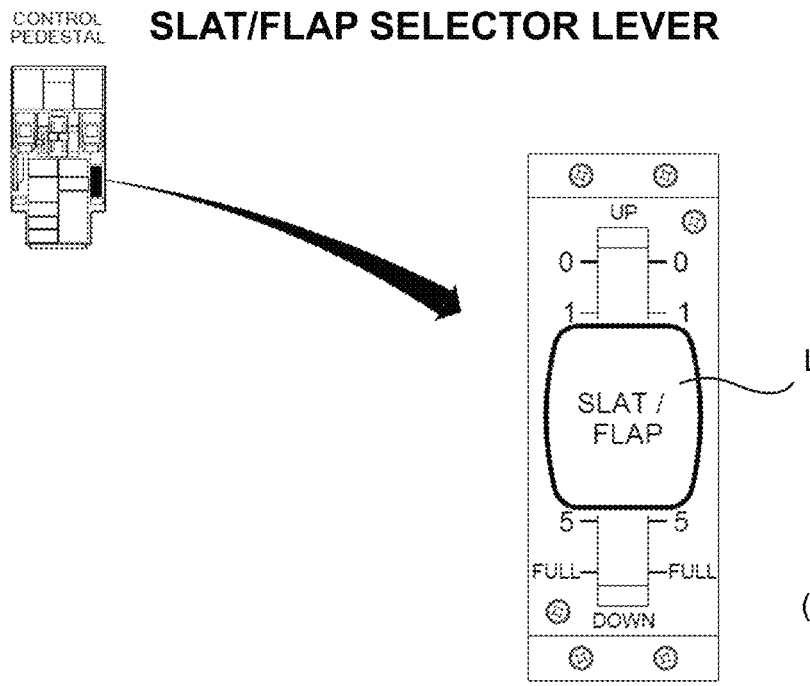
FIG. 2A
(PRIOR ART)
| Lever position | Slat position | Flap Position | Detent/Gated |
|---|---|---|---|
| 0 | 0° | 0° | Detent/Stop |
| 1 | 15° | 7° | Detent |
| 2 | 15° | 10° | Detent |
| 3 | 15° | 20° | Detent |
| 4 | 25° | 20° | Gated/Stop |
| 5 | 25° | 20° | Detent |
| Full | 25° | 37° | Detent/Stop |
FIG. 2B
(PRIOR ART)
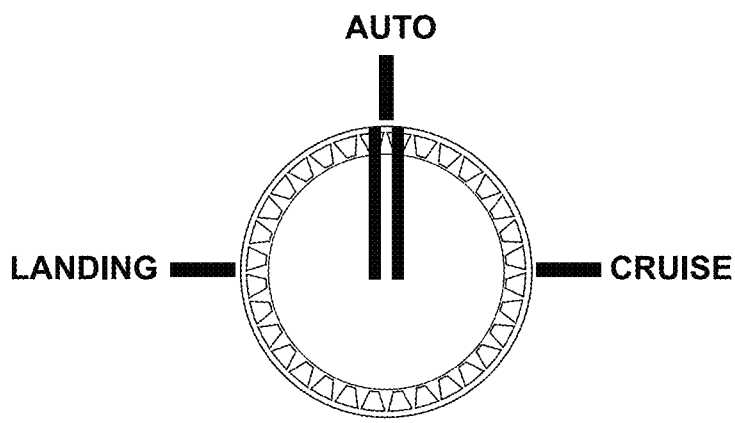
FIG. 3
Non-limiting Example Pilot Override Input Automatic Command for High Lift Devices Diagram Automatic Command for High Lift Devices Setup Lift Control Device Configuration
According to Phase of Flight

AUTOMATIC COMMAND FOR LIFT CONTROL DEVICES

CROSS-REFERENCE TO RELATED APPLICATIONS

None.

STATEMENT REGARDING FEDERALLY SPONSORED RESEARCH OR DEVELOPMENT

None.

FIELD

The technology herein relates to aeronautics and flight control, and more particularly to aircraft and associated methods, apparatus, system and storage devices for automatically positioning lift control devices so an aircraft equipped with this technology will not need to count on the crew to command the lift control devices.

BACKGROUND AND SUMMARY

During the operation of an airplane, the pilots have the responsibility to decide when to command the lift control devices in order to guarantee performance targets and operational requirements. These decisions are often taken during periods of intense workload, when errors are more likely to occur. An inadequate command at the wrong time could potentially cause degradation of safety margins, exceedance of structural limits, or an aerodynamic stall. The parameters and limits that the pilot uses to support these decisions are well known, but should be evaluated in conjunction with the particular phase of flight, actual status of the airplane in the flight path and the airport in which it is operating at that time.

Generally speaking, lift control devices including "high-lift devices" are movable or stationary surfaces that increase or decrease lift during some phases or conditions of flight. For example, lift control devices are used in combination with airfoils in order to reduce the takeoff or landing speed by changing the lift characteristics of a wing. Lift control devices are frequently used during the takeoff and initial climb and during the approach and landing phases of flight but may also be used in any low airspeed situation.

Various types of lift control devices commonly used on aircraft including:
  flaps
  slats
  slots
  spoilers.

As used herein, the term "high-lift device" encompasses each of these individually and plural ones of them in combination.

A flap (see FIGS. 1A, 1B) is a movable surface on the trailing edge of the wing. The flap is controlled from the cockpit, and when not in use, fits smoothly into the lower surface of each wing (FIG. 1A). Flaps are primarily used during takeoff and landing. There are different kinds of flaps including e.g., split flaps, Fowler flaps, slotted flaps and Krueger flaps (the latter being positioned on the wing's leading edge). The use of flaps increases the camber and/or the area of a wing and therefore the lift of the wing, making it possible for the speed of the aircraft to be decreased without stalling. This also permits a steeper gliding angle to be obtained as in the landing approach.

Slats are movable surfaces on the leading edge of the wing. When the slat is closed, it forms the leading edge of the wing. When in the open position (extended forward), a slot is created between the slat and the wing leading edge. This allows the aircraft to reach higher angles of attack, though producing a higher coefficient of lift. So, by deploying slats, an aircraft can fly at slower speeds, allowing it to take off and land in shorter distances.

Slots are created by extended forward movement of a slat. Slots are used as a passageway through the leading edge of the wing. At high angles of attack, the air flows through the slot and smooths out the airflow over the top surface of the wing. This enables the wing to pass beyond its normal stalling point without stalling. Greater lift is obtained with the wing operating at the higher angle of attack.

Spoilers are lift control devices that intentionally reduce the lift component of an airfoil in a controlled way. In some designs and configurations, spoilers are used in conjunction with flaps (steep approach mode, for example). The crew may have separate means to control spoilers individually, regardless of their function.

FIG. 1 shows a non-limiting example of a concrete illustrative example, namely the "high-lift" devices of a prior art aircraft. In this particular example, the high-lift devices consist of flaps F and slats S that are incorporated throughout the wings of the aircraft. The slat system controls eight slat (S) surfaces S1-S8 on the leading edge of the wing (four per wing) and the flap system controls four double slotted flap (F) surfaces F1-F4 on the trailing edge (two per wing). As shown in FIGS. 1A, 1B, when the flap is operated, it slides backward on tracks and tilts downward at the same time, thereby increasing wing camber and increasing the effective size of the wing.

By selectively providing additional lift when deployed, the FIG. 1 high-lift devices F, S allow the aircraft to remain or become airborne at low speeds that are not possible to be achieved when the aircraft/wings are in cruise configuration. Operation at such low speeds is necessary during takeoff and landing operations, due to safety issues, and optimization of runway distances requirements. The crew can command the high-lift devices any time they judge it is necessary.

During operation prior to takeoff, the pilot of the aircraft shown in FIG. 1 needs to set the appropriate high-lift devices setting, considering the airport, payload and the atmospheric parameters at the time of the takeoff. This definition is made during the flight planning, using the information provided by the airplane manufacturer in the airplane flight manual ("AFM") and additional information provided by ground dispatch. Since the high-lift device F, S commands are manually set by the pilot in the FIG. 1 prior art aircraft, a limited number of positions are available, in order to minimize the probability of errors.

FIGS. 2A and 2B show an example of a conventional prior art manual control means (a slat/flaps selecting lever L) for controlling the high-lift devices of the FIG. 1 aircraft. This lever L is located for example on the lower right-hand side of the control console. As FIG. 2A shows, the lever L controls both the slats and the flaps together (on some aircraft, the slats and flaps can be controlled independently). The pilot selects a slat/flap position by lifting a trigger (not shown) below the head of the lever to unlatch the lever, then placing the lifted lever into a desired detented position. In this particular prior art example, there are 7 discrete positions (positions numbered 0-5 plus "Full").

The FIG. 2B chart shows the available positions of the FIG. 2A lever L and the corresponding deployment angles the slats and flaps take for each position of the lever. As FIG.

2B shows, position 0 of lever L controls a flap position of 0° and a slat position of 0° the flaps F and slats S are fully retracted ("Up") and form part of the wing airfoil (see FIG. 1A). Moving lever L to position 1 extends the slats S to a 15° position and extends the flaps to a 7° position (see FIG. 1A). Pulling the lever L further toward the "down" indication results in further extension of the slats S and flaps F at predetermined extended positions of 25° for the slats S and 10°, 20° and 37° for the flaps F. The maximum or "Full" position of lever L controls full deployment of the slats S and flaps F to 25° and 37° respectively. Note that this control lever L controls both the slats S and the flaps F together, and positions 4 and 5 control the same slat/flap deployment with the difference being that position 4 is a gated/stop position that the pilot needs to move past by depressing the trigger again to move the lever to the position 5 detent before proceeding to "Full".

In the example shown, intermediate positions for the high-lift devices are not available for the slat/flap selector lever L. The lever L positions are discrete and detented just like an automatic gear shift lever of an automatic transmission of a car. There are no intermediate positions between for example lever position 0 and lever position 1, or between lever position 1 and lever position 2. If the lever L is left at an intermediate position between the detented positions, slats/flaps S, F remain in the last selected position.

The lever L was designed to have a limited number of available positions in order to minimize the probability of errors and provide a straightforward procedure to the crew. However, this simplification causes the airplane to operate in conditions out of optimum most of the time. The appropriate positions of the high-lift devices are set prior to takeoff, and not during the takeoff run, in order to reduce the number of actions that the pilot should take during this critical phase of the flight. Therefore, when the pilot starts rolling the aircraft down the runway, the additional drag produced by the high-lift devices will be carried throughout the whole takeoff run, increasing the takeoff distance necessary for lift-off.

After the lift-off, the pilot should monitor the speed, rate of climb and altitude. Retraction of the high-lift devices should be commanded when the actual airspeed is above the minimum retraction speed, but below the airspeed for which the high-lift devices structure was designed. This gives to the pilot a small airspeed window to command the high-lift devices, in a period where the pilot workload is still high, mainly due to obstacle clearance and traffic coordination with the control tower. If retraction of the high-lift devices is commanded at lower airspeeds, the airplane could encounter an aerodynamic stall at low altitude, with little space for recovery. If it is commanded at a higher airspeed, the high-lift devices could be structurally damaged or jammed, which could cause an aerodynamic asymmetry and potentially controllability issues.

When returning for landing, the inverse logic applies. The pilot should decelerate the airplane to the appropriate reference landing speed and deploy the high-lift devices. Both are calculated considering the airport and the atmospheric parameters at the time of the landing, using the information provided by the airplane manufacture in the AFM. The pilot should monitor all the parameters and command the high-lift devices' deployment at the appropriate airspeed, in a similar high-workload environment of the takeoff phase (low altitude, obstacle clearance, traffic coordination).

During the landing run, after the touchdown, the airplane needs to decelerate, and this is done with the high-lift devices in the same position used during final approach. It is not current practice for the pilot to command the high-lift devices to retract during this phase mostly due to high workload. The continued extension of the high-lift devices during the landing run after touchdown causes the airplane to use more runway distance for stopping than it might otherwise need to, since the deployed high-lift devices reduce the normal force acting in the landing gear wheels (due to the high-lift), which reduces braking efficiency.

If the pilot needs to abort the landing and go around or even perform a touch-and-go (for any reason), he should apply thrust/power and reconfigure the high-lift devices, while simultaneously watching the airspeed, altitude, rate of climb, obstacle clearance and traffic coordination. Aviation history brings us many examples of accidents that happened at this phase, due to the inability of the pilot to properly handle all that complexity.

Work has been done in the past to provide some degree of automatic control of high-lift devices.

One approach monitors the upper airspeed threshold and automatically retracts the high-lift devices in order to prevent structural damage. The system commands the deployment to the original commanded position when the airspeed is reduced to a compatible value.

In another system, a flight computer is installed in the airplane, and that computer can calculate on board the optimum performance flap, considering all airport and airplane data. Then, the pilot manually sets the flap.

In yet another system, a flight computer is installed in the airplane, and that computer can calculate on board the optimum performance flap for a go around operation, considering the airport being operated and the actual airplane parameters. With this system, when the pilot commands the flap lever to the go-around position, the airplane will automatically set the proper flap for optimum performance.

Another system automatically commands the high-lift systems based on aircraft parameters, but following a preselection made by the pilot using a control panel.

None of these known solutions solve the complete problem, which is eliminating the need of pilot action to command the high-lift devices during all flight phases.

BRIEF DESCRIPTION OF THE DRAWINGS

The following detailed description of exemplary non-limiting illustrative embodiments is to be read in conjunction with the drawings of which:

FIG. 2A shows an example prior art slat/flap selector lever.

FIG. 2B shows an example table showing prior art correspondence between the positions of the FIG. 2A selector lever and slat and flap positions the selector lever controls, and also shows which selector lever positions are detented and which are gated.

FIG. 3 shows a non-limiting example of pilot input control for an example non-limiting automatic lift control system described herein, the pilot input control including an auto position and override inputs.

DETAILED DESCRIPTION OF EXAMPLE NON-LIMITING EMBODIMENTS

Figure 1:
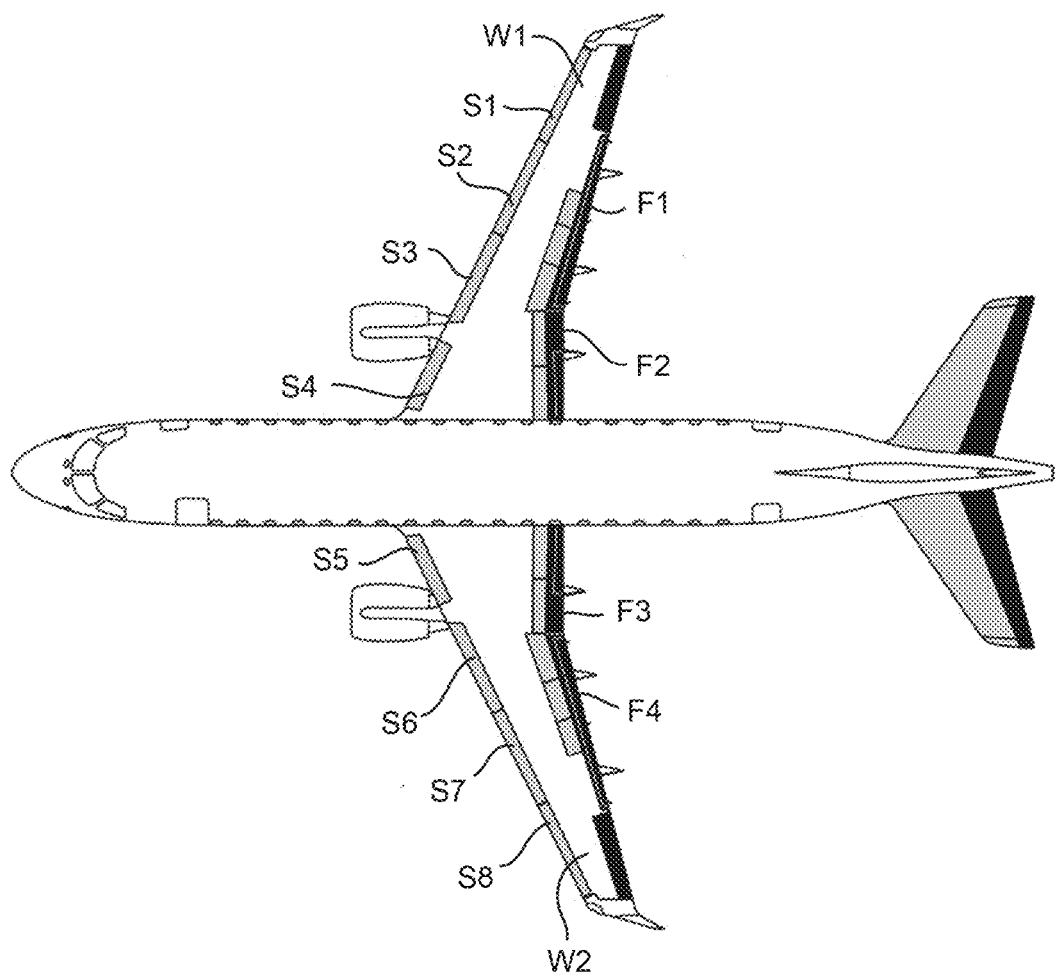
FIG. 1 shows example non-limiting high-lift and other lift control devices on an aircraft.
Figure 1A:
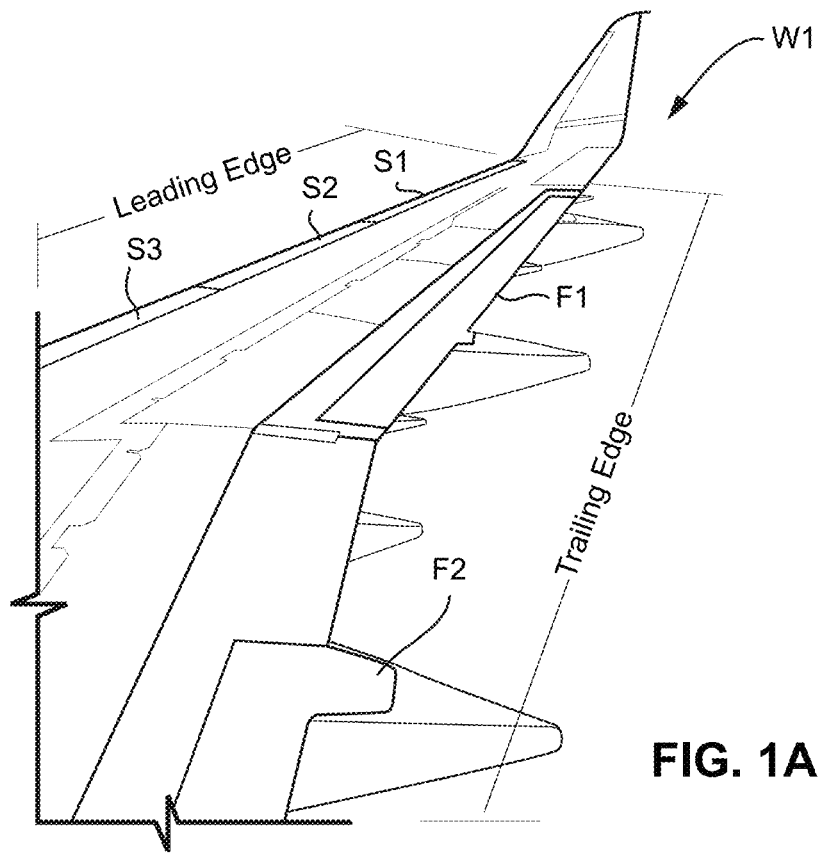
FIGS. 1A and 1B show example flaps in retracted and partially deployed positions, respectively.
Figure 1B:
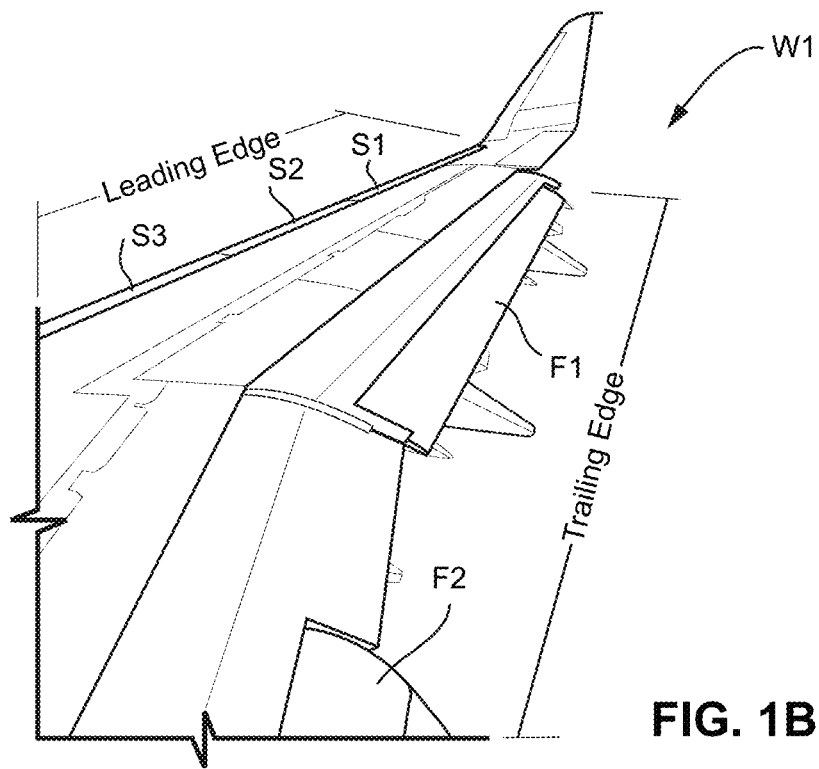

Example non-limiting embodiments herein provide systems, methods and apparatus to automatically position the lift control devices so that an aircraft so equipped will not need to count on the crew to command the lift control devices.

FIG. 3 presents a non-limiting example of an improved slat/flap selector lever or control, wherein the lift control device position selecting mechanism has exactly and only 3 states: Auto, Flap Full and Flap Up (or Auto, Flap Configuration for Cruising, and Flap Configuration for Landing). In the Auto state, the lift control device positioning process becomes automatic. In fact, FIG. 3 shows a non-limiting example. In a possible implementation, the positions would be FULL and UP, but the idea is to have a position for cruise and a position for landing. Some airplanes have negative flaps for cruise configuration (instead of flaps 0), and, depending on the failure hazard analysis of a specific design, the best flap may not be the FULL.

During the performance calculation that is made prior to takeoff, the manufacturer data in the Airplane Flight Manual (AFM) will provide a configuration setting for initializing the ACHiLD system which the pilot will or may be responsible to input or check. This is the only pilot action throughout the whole flight, regarding high-lift devices. For takeoff, landing or go around flight phases, the AFM will provide only a target airspeed that should be followed by the pilot (in contrast with flap position and airspeed that is provided in airplanes equipped with conventional systems).

The Automatic Command High-Lift Device ("ACHiLD") system is configured to constantly monitor the parameters of the aircraft, and the airspeed. As a result, the ACHiLD system will automatically command the adequate lift control devices setting for that condition. The ACHiLD system has this autonomous property by taking into account a plurality of parameters and running the collected data through an e.g., hard coded algorithm in the processor-based computer of the aircraft. At any time, the crew has the option to override the ACHiLD system and position the high-lift devices according to their judgment.

FIG. 3 shows how the crew has the option to use the ACHiDL system (auto) or override it to e.g., fully deploy ("Flap Full") or fully retract ("Flap UP") the high-lift devices. Thus, in the example non-limiting embodiments, the only two emergency override positions are fully or nearly fully deployed (e.g., for full flap landings) and fully (or nearly fully) retracted (e.g., for cruising); otherwise, during normal "auto" operation, an electronic control system automatically continually recalculates new high-lift device positions (e.g., at a level of precision that is beyond typical manual control to provide more optimal performance.)

Using an algorithm hardcoded with basic operational procedures that continuously monitor all the relevant aircraft parameters and pilot actions, an airplane equipped with this system will not need to rely on the pilot during all phases of flight to command the high-lift devices, reducing the pilot's workload throughout the flight and eliminating the possibility of operational errors.

Thus, the ACHiLD system is able to automatically control, without any human intervention, the position of the at least one high-lift device in response to changes in the operation of the aircraft, e.g., in response to the at least one sensor and the at least one manual input, for all phases of flight of the aircraft. By "without any human intervention", we do not mean that all human intervention of any sort is excluded. For example, when the pilot moves the thrust lever to change the amount of engine thrust, the ACHiLD system may respond by automatically adjusting the lift control device(s) accordingly. Thus, the ACHiLD system does respond to manual inputs. However, in the example non-limiting embodiments, there is no need for the pilot to adjust a control that is dedicated to the high-lift devices. Rather, the ACHiLD system uses other manual inputs, sensor information and other prestored information to automatically determine and control high-lift device position based on the current phase of flight and aircraft operating conditions, without the pilot or crew needing to change a manual input controlling only or principally the high-lift devices. The control system infers the intent of the crew by watching other inputs and the operating state and phase of the aircraft, and automatically positions the high-lift devices accordingly.

The pilot/crew has the option of invoking a manual override of the control shown in FIG. 3 to disable automatic control and instead provide Flap Up or Flap Full positions in an emergency or other exceptional operating condition, but this should not be necessary during "normal" flight conditions typically encountered during passenger flights when all systems are working properly. Rather, the pilot/crew can usually "set and forget" the FIG. 3 control to "Auto" and never needs to worry about the automatically-controlled position(s) of the high-lift device(s) during normal aircraft operation.

Figure 4:
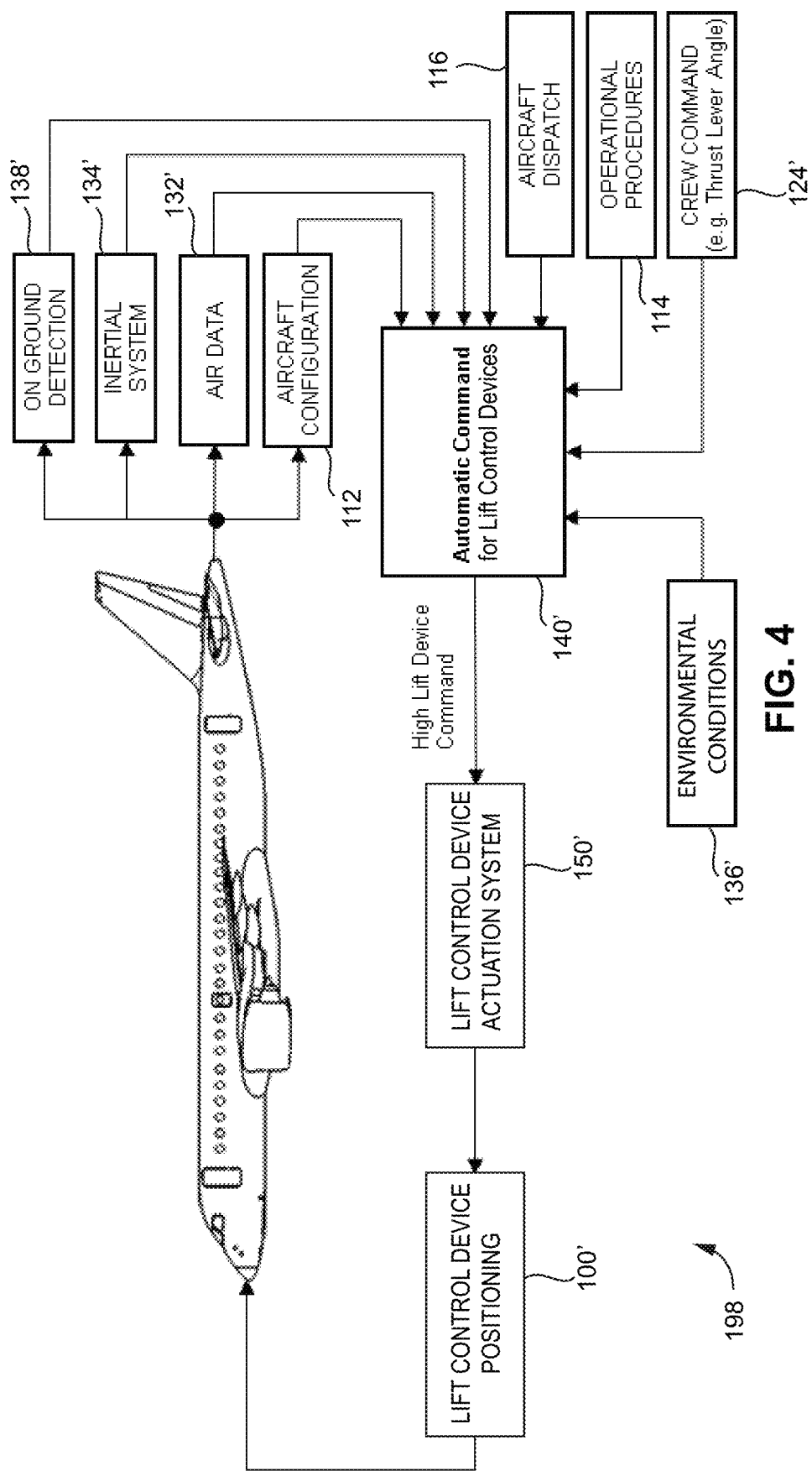
FIG. 4 shows an example non-limiting structural block diagram of Automatic Command for lift control Devices.
Figure 5:
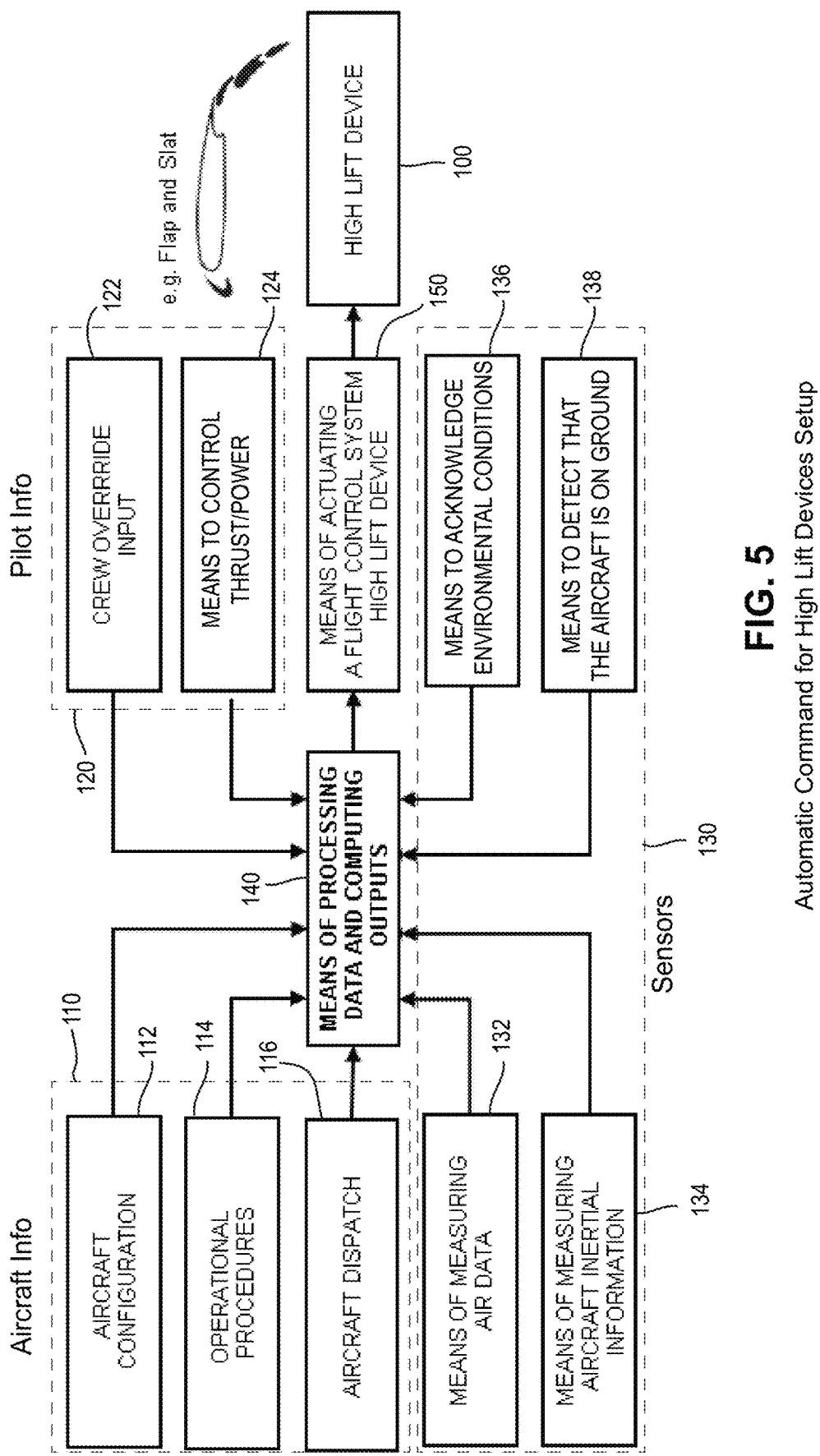
FIG. 5 shows an example non-limiting Automatic Command for lift control Devices Setup structural schematic block diagram.

Example schematics of the system hardware involved in the present non-limiting embodiment are shown in FIGS. 4 and 5. FIG. 4 presents a diagram relating the aircraft and the ACHiLD (Automatic Command for high-lift Devices) system 198. The ACHiLD system 198 is a system comprising: internal algorithms, means to take into account aircraft operational procedures 114, means to compute the current phase of flight 112, and the ability to infer the crew's intention as they control the aircraft.

The FIG. 4 Automatic Command for High-Lift Devices System (ACHiLD) 198 is in one embodiment part of the processor-based flight control computer of the aircraft and operates in part with the Fly-By-Wire system. The aircraft is configured to receive real time data through its sensors 130 (see FIG. 5), located within and outside of the aircraft. Through the sensors 130 (see FIG. 5), the aircraft is able to collect data, such as Air Data 132', Inertial information 134' (e.g., gyroscopic attitude and magnetic or other heading/bearing information), on-ground Phases of Flight Detection 138', Current configuration 112 (e.g., the state of the control surfaces, thrust amount, etc.), and Environmental Conditions 136'. The data is processed by the processor-based flight control computer 140'. The data is turned into commands via a hard-coded algorithm within the flight control computer which calculates high-lift device positioning. Such control computer 140' may comprise a conventional microprocessor-based computer coupled to non-transitory memory storing computer software instructions that are executed to read and analyze data in real time and generate output commands in real time.

The commands are then sent to the actuators 150' of the aircraft through the Fly-By-Wire system (which can provide wired, optical and/or wireless commands and is thus not limited to "wires") and as a result the high-lift devices are positioned 100'. This is a recurring process, as the data sensed by the sensors 130 changes, the processor-based flight control computer 140' recalculates the high-lift device positioning 100' and sends the new commands, via the Fly-By-Wire Processor, to the actuators 150' to readjust the high-lift devices 100'.

There can be more than one actuator (e.g., one for each of the high-lift devices). The high-lift device actuators are coupled to the electronic controller or control computer by a fly-by-wire control connection. The actuators may comprise a mechanical, hydraulic and/or electromechanical device of conventional design that applies force to position the at least one high-lift device.

FIG. 5 shows a non-limiting example schematic diagram of hardware and other components provided by an example non-limiting embodiment. The aircraft's information 110 is able to show the current aircraft configuration 112, the operational procedures information 114, and the aircraft's dispatch information 116. The pilot input 120 has control of thrust and power 124 of the aircraft, as well as the ability to utilize the crew override input 122 of FIG. 3 described above. The crew override input 112, also referred to as the pilot override input, is a three state mechanism as explained above. The non-limiting technology herein uses at least one means to measure air data 132 (e.g. probes, pitot-static, static port), at least one means of measuring aircraft inertial information 134 (e.g., an attitude and heading reference system AHRS), at least one means 138 to detect if the aircraft is on the ground or in flight (e.g. weight on wheel sensor), and at least one means 136 to acknowledge or sense environmental conditions. These means of measuring an assortment of data are conducted by a variety of sensors 130 within and outside of the aircraft.

All the data accumulated from the aircraft's information 110, pilot input 120, and sensors 130, is then processed in the flight control computer 140 of the aircraft. Furthermore, the flight control computer 140 is configured to execute instructions, access data and compute commands. The commands (which may be provided to a conventional fly-by-wire system) are configured so that the actuating system 150 of the aircraft responds according to instructions that the flight control computer 140 sends. The actuator system 150 positions the high-lift devices 110 in accordance to the instructions given by the flight control computer 140.

The non-limiting embodiment shown in FIG. 5 includes a means 132 to measure air data (e.g., probes, pitot-static, static port), an inertial measuring system (e.g., AHRS) 134, some of the aircraft dispatch data 116, means 112 to determine the current aircraft configuration (e.g., flap, slats, spoilers, landing gear position), means 138 to determine if the aircraft is on ground or in air (e.g., weight on wheels sensor), a crew override input 122 (e.g., to be used in case of a failure condition), means 124 to control thrust/power, means 140 to compute the desired high-lift devices deflection and means 136 to acknowledge the environmental conditions (e.g., flight in icing conditions). All this information is processed in some electronic device 140 such as, but not limited to, the Fly-By-Wire processor. Finally, this command is sent to the high-lift devices actuators 150 to control high-lift devices 100.

Figure 6:
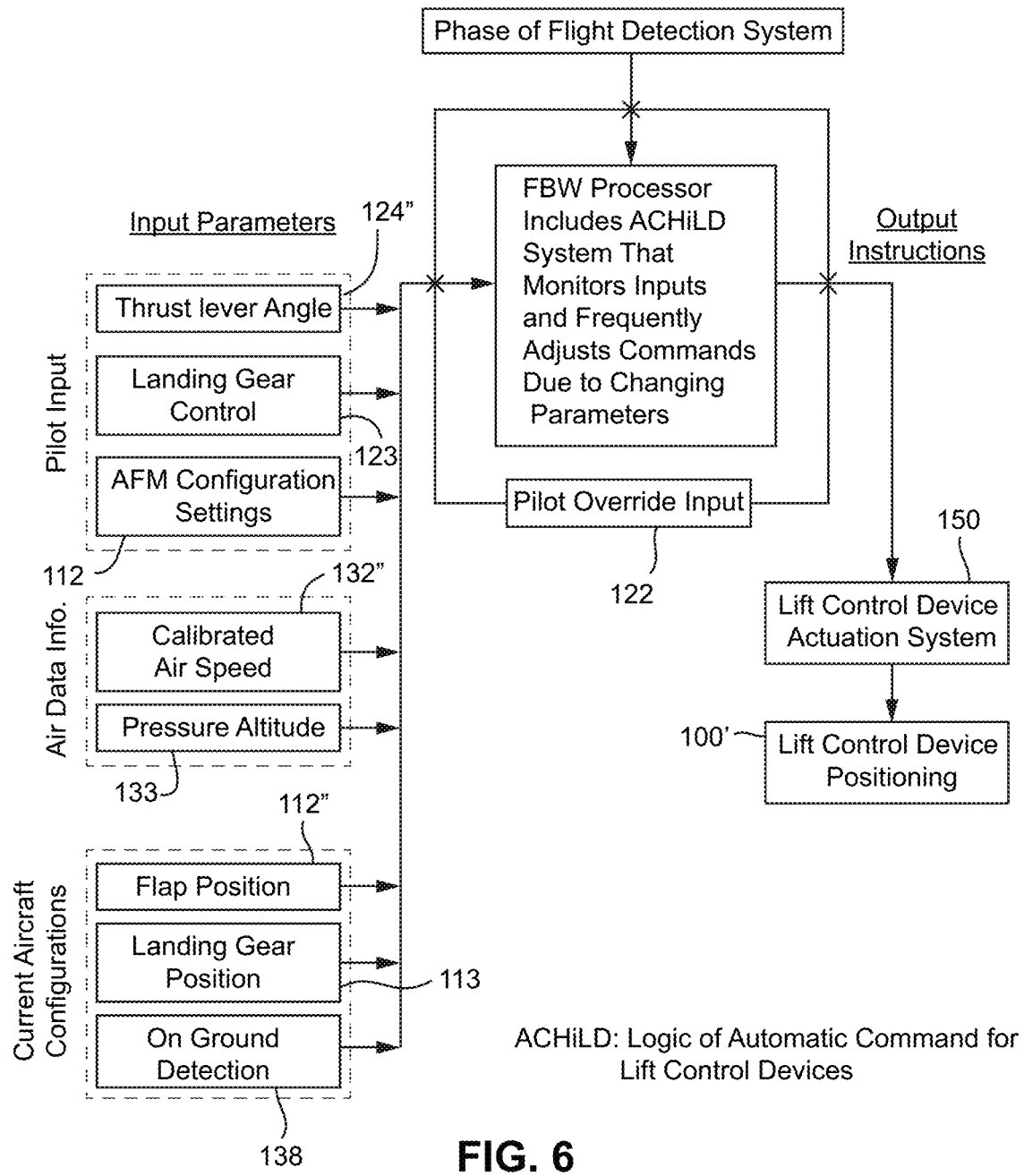
FIG. 6 is an example logic functional diagram of an example non-limiting automatic command system for lift control devices.

FIG. 6 is a non-limiting diagram of the illustrative control logic for the ACHiLD system. Before takeoff, the aircraft's flight control computer receives data to prepare the aircraft for dispatch. During this whole process the ACHiLD system is calculating the proper setting for the high-lift devices as the aircraft gets ready to takeoff. As the phases of flight change, the parameters which dictate the high-lift device settings changes as well.

These parameters, referred to as Input Parameters, include: thrust lever angle 124", landing gear control 123, calibrated airspeed 132", pressure altitude 133, flap and other control surface sensed positions 112", sensed landing gear positions 113 and sensed on-ground detection 138. The ACHiLD system monitors inputs from the pilot and the status of the aircraft and calculates the high-lift device setting(s). The ACHiLD system constantly updates the high-lift position in part with its hard-coded algorithm executed by the processor-based flight control computer e.g., by using algorithms to infer the intention of the crew based on the pilot input and state of aircraft operations. Thereafter, the resulting recurring commands that are frequently adjusted due to the changing input parameters are sent to the Fly-By-Wire system—which sends commands to the aircraft's actuation system 150. The actuation system 150 is able to position the high-lift device(s) according the commands it receives. At all points during the process, the pilot has access to the Pilot Override Input 122 (override in the flow of logic is represented by the "x" symbols in the flow chart); this input allows the pilot to manually set the high-lift device to a cruise configuration (for example, no flap) or a landing configuration (for example, full flap) if the automatic control system fails.

Figure 7:
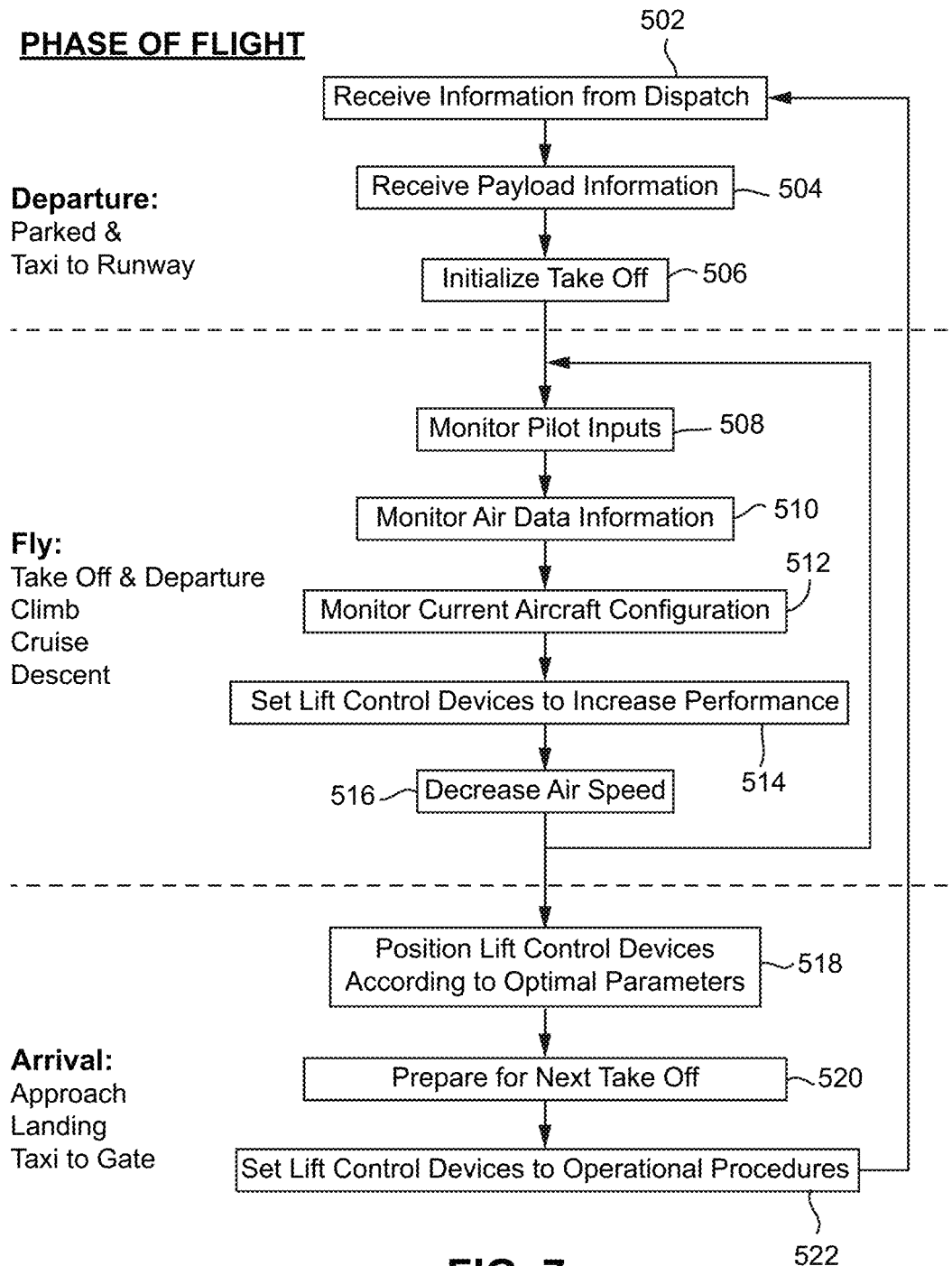
FIG. 7 shows an example process flow diagram for lift control device configuration according to phases of flight.

FIG. 7 presents a non-limiting flow chart showing operations of the ACHiLD system. FIG. 7 shows three main phases of flight, each comprised of sub-phases of flight. The three primary phases of flight shown are: Departure, Fly, and Arrival. Departure is further comprised of a Parked state, a Taxi to Runway state and a takeoff state. The Fly phase of flight is comprised of a Climb state, a Cruise state, and a Descent state. The last phase of flight, Arrival, is comprised of an Approach state, a Landing state, and a Taxi to Gate state.

Before every flight, during the Departure phase of flight, the aircraft receives the dispatch data (502), which is calculated using information such as the payload and initial airport data. During the Fly phase of flight, the sensors of the aircraft monitor pilot inputs (508), air data including airspeed (510), and the current configuration (512) of the aircraft. The airplane may not need to receive payload directly, but the results of a calculation that uses the payload. As the aircraft reaches the end of the Fly phase, it decreases its airspeed (516) and enters the Arrival phase of flight by positioning the high-lift devices 518 according to optimal parameters for landing. Once the aircraft is taxied to the proper gate, it is prepared for the next Takeoff (520). During each and every one of these phases and subphases of flight, the high-lift devices are automatically controlled by the ACHiLD system through the flight control computer via the actuation system of the aircraft.

Information obtained from the dispatch 116, calculation made prior to flight according to the Aircraft Flight Manual (AFM) 114 and the payload (504), is used to initialize the system 198 for take-off (506).

Directly following the preparations for takeoff, the ACHiLD system 198 monitors the pilot inputs 124' (508) (e.g., retracting landing gear, increasing the thrust lever angle, etc.), air data information 132' (510) (e.g., Calibrated Airspeed, Pressure Altitude, etc.) and the current aircraft configuration 112 (512) (e.g., flap position, landing gear position, etc.) to set the lift control devices so that the aircraft's performance increases with respect to the standard safety margins and the aircraft operational procedures (514).

As a non-limiting example, as the aircraft's speed decreases (516) towards the reference landing speed (Vref) and the crew commands the deployment of the landing gear, the ACHiLD system interprets such situation as the approach phase and sets the lift control device(s) such that they provide the necessary lift coefficient for this flight phase while preserving adequate margins to prevent stall (518). On the other hand, as the crew pushes the thrust lever 124' forward and the airspeed sensed by 132' increases, the lift control devices are retracted to decrease drag while monitoring operational margins (514).

As the aircraft touches down on the runway during the flare maneuver, the aircraft configures itself to decrease airspeed more efficiently (e.g., by partially retracting the high-lift devices) and then prepares itself for a new takeoff (520), if the system interpret it as the crew intention. While taxiing in or out, the lift control devices are positioned according to operational procedures.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A system for automatically controlling a lift control device on an aircraft for flight phases including at least takeoff, climb, cruise, descent, approach and landing, the lift control device being positionable by a lift control device actuator to a takeoff position, a cruise position, a landing position, and positions therebetween, comprising:
    at least one sensor configured to monitor at least one condition of the aircraft during flight;
    a manual lift control mode selector including an Auto selection;
    a manual input designated to control an aircraft operating parameter other than the lift control device; and
    an electronic controller coupled to the at least one sensor, the manual lift control mode selector, the manual input and the lift control device actuator, the electronic controller being configured to receive data from the sensor and the manual input and to produce commands to automatically control a position of the lift control device via the lift control device actuator in response to changes in the operation of the aircraft with the manual lift control mode selector set to the Auto selection and applied to each of the flight phases that include takeoff, climb, cruise, approach and landing flight phases while remaining in the Auto selection.

2. The system of claim 1 wherein the lift control device actuator is coupled to the electronic controller by a fly-by-wire control connection, the lift control device actuator comprising a mechanical, hydraulic and/or electromechanical device that applies force to set the position of the lift control device.

3. The system of claim 1 wherein the manual lift control mode selector further includes at least one override lift control device position selection.

4. The system of claim 3 wherein the at least one override lift control device position selection includes a configuration for the "cruise" phase.

5. The system of claim 3 wherein the at least one override lift control device position selection includes a configuration for the "landing" phase.

6. The system of claim 1 wherein the lift control device comprises a flap.

7. The system of claim 1 wherein the lift control device comprises a slat.

8. The system of claim 1 wherein the lift control device comprises a spoiler.

9. The system of claim 1 wherein the at least one lift control device comprises a high-lift device.

10. The system of claim 1 wherein the manual input controls thrust.

11. The system of claim 1 wherein the electronic controller automatically determines all positions of the lift control device intermediate of UP and FULL for all phases of flight without any human intervention.

12. The system of claim 1, wherein the system continuously and automatically verifies the aircraft's phase of flight and in a recurring manner readjusts the lift control device by recalculating according to flight conditions sensed by the sensor.

13. The system of claim 1, wherein the lift control device is positioned according to override "Landing", override "Cruise", and Auto modes that a pilot manually inputs via the manual lift control mode selector.

14. The operating control panel of claim 13, wherein placing the manual lift control mode selector in an Auto mode position automatically configures the electronic controller to position the lift control device, via the lift control device actuator, in response to sensed aircraft environment and pilot aircraft control input.

15. The system of claim 1, wherein the manual lift control mode selector provides no intermediate predefined lift control device positions between "Landing" and "Cruise".

16. A system for controlling an aircraft, comprising:
    at least one sensor configured to monitor at least one condition of the aircraft;
    at least one manual input for controlling an operation of the aircraft other than a lift control device;
    a manual lift control mode selector having a plurality of positions including Auto; and
    an actuator that positions at least one lift control device in response to received control signals from a control computer,
    the control computer being operatively coupled to the actuator, the at least one sensor, the at least one manual input and the manual lift control mode selector, the control computer configured to automatically generate control signals for the actuator to automatically control, without any human intervention, a position of the at least one lift control device by inferring a phase of flight of the aircraft from the at least one sensor and the at least one manual input, for all phases of flight of the aircraft including at least takeoff, climb, cruise, descent, approach and landing with the manual lift control mode selector set to an Auto selection and applied to each of the flight phases that include takeoff, climb, cruise, descent, approach and landing flight phases while remaining in the Auto selection.

17. The system of claim 16 wherein the control computer does not require any additional lift control device manual control input setting during flight to automatically control the at least one lift control device during all phases of flight.

18. The system of claim 16, wherein the phases of flight of the aircraft further include: go-around and taxiing.

19. A method of controlling an aircraft, comprising:
    configuring a manual selecting mechanism to take human input including an explicit Auto(matic) setting;
    sensing and/or determining a current configuration and ambient parameters of the aircraft via at least one sensor configured to monitor at least one condition;

with a control computer in response to the sensing and/or determining, automatically calculating lift control device position settings throughout all phases of flight including at least takeoff, climb, cruise, descent, approach and landing upon the state of the manual selecting mechanism being in Auto and outputting commands that serve as instructions for at least one actuator with the manual selecting mechanism set to the Auto selection and applied to each of the flight phases that include takeoff, climb, cruise, approach and landing flight phases while remaining in the Auto selection;

the at least one actuator automatically executing the commands to automatically actuate at least one lift control device.

20. The method of claim 19, wherein the manual selecting mechanism settings consist essentially of Auto, Landing Flap and Cruise Flap.

21. The method of claim 19, further comprising:
automatically controlling a position of the at least one lift control device by inferring a phase of aircraft operation and a crew's intention in response to at least one sensor and at least one manual input, for all phases of flight of the aircraft without requiring any manual input to directly control the at least one lift control device.

22. An aircraft comprising:
at least one sensor configured to monitor at least one condition of the aircraft;
an operating control panel comprising at least one lift control device position selecting mechanism;
wings;
lift control devices mounted to the wings;
a processor-based flight control computer configured to automatically compute, without human intervention, lift control device settings for aircraft phases of flight of the aircraft including take-off, landing, approach, go-around, touch-and-go, and taxiing, and to generate fly-by-wire commands, the processor-based flight control computer including at least one electronic controller coupled to the at least one lift control device position selecting mechanism wherein upon the at least one lift control device position selecting mechanism being placed in an Auto position, the electronic controller is configured to automatically control the position of the lift control devices at least in response to sensed aircraft environment and pilot aircraft control input with the lift control device position selecting mechanism set to the Auto position and applied to each of the flight phases that include takeoff, landing, approach, go-around, touch-and-go, and taxiing, while remaining in the Auto position; and an actuation system coupled to receive the fly-by-wire commands from a processor-based flight control computer, the actuation system controlling position of the lift control devices mounted to the wings according the commands received from the processor-based flight control computer.

23. The aircraft in claim 22, wherein the at least one lift control device position selecting mechanism is configured to receive input directly from a pilot, and has three states consisting essentially of: Auto, Landing and Cruise.

24. The aircraft in claim 22, wherein the at least one lift control device position selecting mechanism comprises an input dependent mechanism, such that the at least one lift control device position selecting mechanism will incur no change unless it is manually changed, and the processor-based flight control computer is capable of automatically choosing proper settings for the lift control devices in response to the at least one lift control device position selecting mechanism being set to Auto.

25. A non-transient machine readable storage medium having stored thereon a computer program comprising a set of instructions for causing at least one processor to perform:

receiving Landing, Cruise and Auto hand input states from a selecting mechanism configured to take pilot hand input;

sensing and/or determining a current configuration and ambient parameters of an aircraft via at least one sensor; and in response to the at least one sensor and the hand input, automatically calculating upon the state of the selecting mechanism being in Auto, lift control device settings throughout all phases of flight of the aircraft including at least takeoff, climb, cruise, descent, approach and landing, by inferring the intention of a crew and a phase of flight and outputting commands that instruct at least one actuator to automatically position lift control devices in accordance with the calculated lift control device settings with the selecting mechanism set to the Auto position and applied to each of the flight phases that include takeoff, climb, cruise, descent, approach and landing, while remaining in the Auto position.

* * * * *